3,519,699
POLYAMIDE BLENDS CONTAINING DICARBOXY DIPHENYL SULFONE GROUPS AND PIPENIDYL GROUPS
Edward W. Pietrusza, Morristown, and Jack R. Pedersen, Parsippany, N.J., assignors to Allied Chemical Corporation, New York, N.Y., a corporation of New York
No Drawing. Filed Jan. 25, 1968, Ser. No. 700,349
Int. Cl. C08g 41/04
U.S. Cl. 260—857                  7 Claims

ABSTRACT OF THE DISCLOSURE

This specification discloses novel moisture resistant polymer blends of nylon 6 or nylon 66 and a sulfone polyamide derived from the reaction of 4,4'-dichlorocarbonyldiphenylsulfone and a diamine containing at least one piperidyl group. The blends are particularly suitable for the preparation of moisture resistant fibers.

---

The nylons have won wide commercial acceptance due to their excellent physical properties, particularly the high strengths of nylon fibers. When used in tire cord, however, nylon tires have exhibited flatspotting; that is, upon standing for prolonged periods in one position, the tires deform and develop a temporary set or flattened portion. This results in a bumpy, uneven ride which is a problem particularly for new automobiles when tires remain in one position during shipment and while awaiting sale. This characteristic has limited the use of nylon reinforced tires as standard equipment on new automobiles, in spite of their high strength. Further, the tendency to deform under an applied stress increases after exposure to high temperatures and moisture.

Thus it is an object of the present invention to provide novel nylon compositions having improved heat and moisture resistance.

It is another object to provide nylon fibers having a lowered tendency to deform under an applied stress.

Further objects will become apparent from the following detailed description thereof.

We have discovered that nylon can be modified by blending with a linear sulfone polyamide selected from the group consisting of those having recurring units of the formula

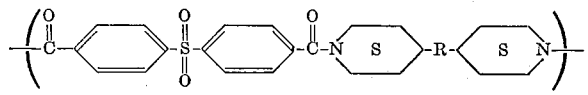

and

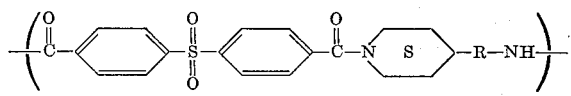

wherein R is an alkyl group of 1 to 6 carbon atoms. The blends of the invention are suitable for the preparation of fibers, films and molded articles having improved heat and moisture resistance. The physical properties of the blends can be varied depending upon the amount and properties of the additive polyamide.

Polyamides prepared from 4,4'-dichlorocarbonyldiphenylsulfone and diamines containing one or more piperidyl groups are disclosed in greater detail in a copending application of the present inventors entitled "Novel Moisture Resistant Polyamides," Ser. No. 700,344. The reactants can be polymerized in solution in the presence of a catalyst, preferably at an elevated temperature, with the evolution of hydrogen chloride. 4,4'-dichlorocarbonyldiphenylsulfone can be prepared by reacting 4,4'-dicarboxydiphenylsulfone with a solution of phosphorous pentachloride and phosphorus oxychloride. The excess phosphorus oxychloride is distilled off and the product can be isolated by distillation or recrystallization from a suitable solvent.

The diamines suitable for use in the process of the invention include 1,1-di-4-piperidyl methane, 1,3-di-4- piperidyl propane, 2,2-di-4-piperidyl isopropane, aminomethyl piperidine, aminopropyl piperidine, aminohexyl piperidine and the like. Diamines containing two piperidyl groups give polyamides which are especially preferred due to their high moisture resistance.

According to our process, equimolar amounts of 4,4'-dichlorocarbonyldiphenylsulfone and a diamine as described hereinabove are reacted in a catalyzed solution at least until the evolution of hydrogen chloride has ceased. By varying the conditions of time and temperature of the reaction, the concentration of the reactants and the particular diamine employed, a wide range of polyamides can be prepared having determinable molecular weights and properties. Copolyamides can also be prepared by employing a mixture of diamines.

Equimolar amounts of 4,4'-dichlorocarbonyldiphenylsulfone and diamine are preferred in our process since the presence of an excess of either reactant will act as a terminator for the polymerization reaction, resulting in the formation of low molecular weight polymers.

The solvent should be a solvent for both the 4,4'-dichlorocarbonyldiphenylsulfone and the diamine and preferably for the resultant polyamide as well, although this is not required. In general, aromatic hydrocarbons and halogenated aromatic hydrocarbons are solvents which can be employed in the process of the invention, including benzene, toluene, o-, m- and p-xylene, p-cymene, diphenylmethane, 1,3,5 - triethylbenzene, chlorobenzene, o-dichlorobenzene, 1,2,4-trichlorobenzene and the like. In general, the use of higher boiling solvents will result in the formation of higher molecular weight polymers.

Effective catalysts include metals such as magnesium, zinc, aluminum and metal salts such as cuprous chloride. Additional metals and metallic salts which are effective as catalysts in the process of the present invention can be determined by one skilled in the art by test runs. The catalyst concentration can be from about 0.01 to about 2.0% by weight of the reactants. In the absence of an effective catalyst, low molecular weight polymers may be obtained. Particularly outstanding results are obtained using magnesium metal as the catalyst.

The polymerization reaction proceeds readily at the reflux temperature of the reaction mixture, which depends upon the boiling point of the particular solvent employed during the polymerization. In general, the rate of polymerization will increase at higher reaction temperatures.

The time required for formation of high molecular weight polyamide will vary depending upon the temperature of the reaction, the purity of the reactants and the choice of catalyst. The reactants and the solvent must be essentially free of impurities and water which cause degradative side reactions and chain termination and prevent the formation of high molecular weight polymers. Increasing the time of reaction increases the molecular weight of the resultant polyamide with an accompanying increase in the flow or melting temperature and the decomposition temperature of the polymer.

The product can be isolated in any conventional manner as will be known to one skilled in the art. One method is to filter off the catalyst and pour the solution into a nonsolvent for the polymer, thereby precipitating it. The precipitated polymer is then washed and dried.

The blends of the invention can be prepared by heating a nylon, preferably polycaprolactam or polyhexamethyleneadipamide, with from about 1 to about 99% by weight of a sulfone polyamide described above at a temperature ranging from the melting point of the highest melting component up to the decomposition temperature of the polymers, preferably from about 250–320° C. The blends preferred according to the invention contain from about 20 to about 40% by weight of the sulfone polyamide based on the weight of the blend. The nylon and the sulfone polyamide described above can be dry blended before melting, or the blending process can be carried out by stirring or by extrusion. Since it is desired to have a low moisture content while blending to prevent degradation reactions of the nylon, blending is preferably carried out in a dry, inert atmosphere.

Alternatively, the blends can be prepared in solution by dissolving the nylon and the sulfone polyamide in a suitable solvent and precipitating a mixture of the polymers either by evaporating the solvent or by adding a nonsolvent to the solution.

The blends can be formed into molded articles or monofilaments by conventional methods. Monofilaments can be drawn into fibers by the well known techniques utilized for nylons. Typically the blends of the invention are melted, mixed, and formed into a monofilament in a single step process in an extruder.

Certain physical properties of nylon can be modified by adding various amounts of the sulfone polyamides described herein. For example, blending a nylon with a sulfone polyamide having a lower reduced viscosity than the nylon produces a blend having an intermediate viscosity, depending upon the proportion of sulfone polyamide added. Further, the blends of the invention substantially decrease the set developed by nylon when exposed to an applied stress as measured by flatspot index. This measurement, which correlates well with the flatspotting propensity of yarns when manufactured into tires, is determined as follows:

APPARATUS

The fiber to be tested is hung inside a 12-inch long tube provided with heating means. The lower end of the fiber is fitted with a hook on which weights can be attached. The bottom of the hook has a pointer which moves vertically opposite a scale graduated into 0.01 inch, enabling changes in the length of the fiber to be accurately determined. The tube is constantly flushed by a stream of dry nitrogen.

TESTING

After conditioning, the following steps are carried out consecutively, measuring the length of the sample yarn at every step:

(1) Without removing the load, the fiber is cooled to room temperature.
(2) The fiber is heated to 100° C.
(3) Steps 1 and 2 are repeated until a constant fiber length is obtained.
(4) Maintaining the fiber at a temperature of 100° C., a load equivalent to 0.5 gram per denier is removed.
(5) The fiber is cooled to room temperature.
(6) The load removed in Step 4 is replaced.

The difference in readings between Step 1 and Step 6, expressed as percent length, is the flatspot index. The test results are the average of three consecutive determinations which agree within 0.1 percent.

The invention can be further illustrated by the following examples but it is to be understood that the invention is not meant to be limited to the details disclosed therein. In the examples all parts and percentages are by weight unless otherwise noted. Glass transition temperatures were determined by differential thermal analysis. Tensile properties were determined according to ASTM test D–2256–66T at 0% RH and 100% extension per minute. The reduced viscosity of the sulfone polyamides, the nylons and the blends of the invention were determined as a 0.5% solution in m-cresol at 25° C.

EXAMPLE 1

86 parts of 4,4'-dichlorocarbonyldiphenylsulfone and 1000 parts by volume of o-dichlorobenzene were charged to a vessel fitted with a stirrer, nitrogen inlet and outlet and means of heating. The mixture was heated to 150° C. and a solution containing 52.5 parts of 1,3-di-4-piperidyl propane in 300 parts by volume of o-dichlorobenzene was added. 0.5 part of magnesium powder was added and the mixture heated at reflux for 6.5 hours. The mixture was cooled to room temperature and the solvent decanted. The polymer product was dissolved in dimethylformamide and the solution was filtered to remove the catalyst. The solution was added to isopropanol to precipitate the product. The product was collected, washed with isopropanol and dried.

100 parts of polymer having a reduced viscosity of 0.78, a melting point of 235–255° C. and a glass transition temperature of 180° C. were obtained.

80 parts of the polyamide prepared as above were blended with 120 parts of polycaprolactam having a reduced viscosity of 1.8, a melting point of 215° C. and a glass transition temperature of 45° C. in an extruder at 290° C. and extruded as a monofilament. The blend had a reduced viscosity of 1.34. The monofilament was drawn at 190° C. to a draw ratio of 5:1.

The dry fiber had the following properties: ultimate elongation, 11.8%; ultimate tensile strength, 4.3 grams/denier; tensile modulus, 78 grams/denier. The flatspot index was 1.38.

EXAMPLE 2

52.5 parts of 1,3-di-4-piperidyl propane, 86 parts of 4,4'-dichlorocarbonyldiphenylsulfone, 0.4 part of magnesium powder and 1000 parts by volume of o-dichlorobenzene were charged to a vessel as in Example 1 and refluxed for 12 hours. The product was recovered as in Example 1.

105 parts of a polymer having a reduced viscosity of 0.71 were obtained.

90 parts of the polyamides prepared as above and 210 parts of polycaprolactam described in Example 1 were blended and extruded as a monofilament as in Example 1. The monofilament was drawn at 190° C. to a draw ratio of 5.5:1.

The fiber had the following properties: ultimate elongation, 13.0; ultimate tensile strength, 5.42 grams/denier; tensile modulus, 119.4 grams/denier; and flatspot index 1.30.

Another portion of the monofilament was drawn at 200° C. to a draw ratio of 6:1. The dry fiber had the following properties: ultimate elongation, 12.9%; ultimate tensile strength, 5.4 grams/denier; tensile modulus, 112.4 grams/denier; and flatspot index, 1.25.

EXAMPLE 3

Fibers prepared as in Examples 1 and 2 above were exposed to steam for five minutes at various temperatures to determine changes in properties due to exposure to moisture and compared to unmodified polycaprolactam (nylon 6). The results are given in the table below:

| Fiber | Flatspot index | Percent shrinkage | Break strength, grams | Tensile modulus, grams/denier | Ultimate elongation, percent |
|---|---|---|---|---|---|
| | | | Before Steaming | | |
| Ex. 1 | 1.4 | | 1,150 | 71 | 12 |
| Ex. 2 | 1.3 | | 2,670 | 72 | 15 |
| Nylon 6 | 2.5 | | 1,970 | 68 | 11 |
| | | | Steamed at 120° C. | | |
| Ex. 1 | 1.7 | 12 | 1,180 | 45 | 32 |
| Ex. 2 | 1.8 | 9 | 2,460 | 40 | 26 |
| Nylon 6 | 4.1 | 11 | 1,920 | 39 | 27 |
| | | | Steamed at 140° C. | | |
| Ex. 1 | 2.4 | 16 | 1,060 | 40 | 46 |
| Ex. 2 | 2.4 | 16 | 2,440 | 40 | 46 |
| Nylon 6 | 5.9 | 19 | 1,730 | 27 | 41 |
| | | | Steamed at 150° C. | | |
| Ex. 1 | 2.7 | 19 | 760 | 35 | 66 |
| Ex. 2 | 2.7 | 21 | 1,860 | 37 | 54 |
| Nylon 6 | 6.6 | 27 | 1,100 | 37 | 59 |

EXAMPLE 4

5.15 parts of 4,4'-dichlorocarbonyldiphenylsulfone, 3.20 parts of 1,3-di-4-piperidyl propane, 0.05 part of powdered magnesium and 200 parts by volume of o-dichlorobenzene were charged to a vessel as in Example 1 and refluxed for 5 hours. The polymer product precipitated on cooling, and was collected and dried.

The polymer had a reduced viscosity of 1.82, a melting point range of 270-285° C. and a glass transition temperature of 180° C.

A portion of the product was dissolved in dimethylformamide and cast into a self-sustaining, flexible film. The film had the following properties: ultimate elongation, 12.3%; ultimate tensile strength, 10.370 p.s.i.; and 2% secant modulus, 123,330 p.s.i.

EXAMPLE 5

5.4 parts of aminomethylpiperidine, 17.15 parts of 4,4'-dichlorocarbonyldiphenylsulfone, 0.1 part of powdered magnesium and 400 parts by volume of o-dichlorobenzene were refluxed in a vessel as in Example 1 for 24 hours. A solid formed shortly after refluxing began. The polymer product was washed with acetone and dried.

17 parts of polymer having a reduced viscosity of 0.14 (determined in sulfuric acid) and a softening point of 280-285° C. were obtained.

It is apparent that numerous modifications and variations may be effected without departing from the novel concepts of the invention and the illustrative details disclosed are not meant to be construed as imposing undue limitations on the invention.

We claim:
1. A novel composition consisting essentially of a blend of a polyamide selected from the group consisting of polycaprolactam and polyhexamethyleneadipamide and from 1% to about 99% by weight of a linear sulfone polyamide selected from the group consisting of polyamides having recurring units of the formula

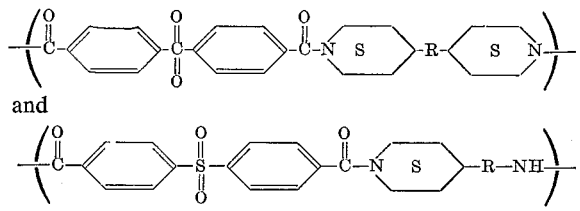

and

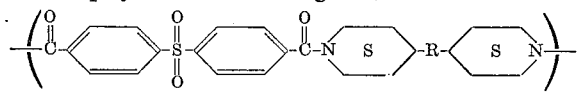

wherein R is an alkyl radical of 1 to 6 carbon atoms.

2. A composition according to claim 1 wherein said sulfone polyamide has recurring units of the formula 3. A composition according to claim 2 wherein R is a propyl radical.

4. A composition according to claim 2 wherein said blend contains from about 20 to about 40% by weight of said sulfone polyamide.

5. A fiber formed from the composition according to claim 1.

6. A fiber formed from the composition according to claim 2.

7. A fiber formed from the composition according to claim 3.

References Cited

UNITED STATES PATENTS

| 3,094,511 | 6/1963 | Hill et al. | 260—78 |
| 3,371,068 | 2/1968 | Preston et al. | 260—78 |
| 3,377,303 | 4/1968 | Peerman | 260—18 |
| 3,433,853 | 3/1969 | Earle | 260—857 |

SAMUEL H. BLECH, Primary Examiner

PAUL LIEBERMAN, Assistant Examiner

U.S. Cl. X.R.

152—359; 260—78

PO-1050
(5/69)

UNITED STATES PATENT OFFICE
CERTIFICATE OF CORRECTION

Patent No. 3,519,699          Dated July 7, 1970

Inventor(s) Edward W. Pietrusza and Jack R. Pedersen

It is certified that error appears in the above-identified patent and that said Letters Patent are hereby corrected as shown below:

Claim 1, line 25, in the first of the two formulas, $$\overset{\overset{O}{\|}}{\underset{\underset{O}{\|}}{C}} \text{ should be } \overset{\overset{O}{\|}}{\underset{\underset{O}{\|}}{S}}.$$

Column 4, line 63, "13.0" should be --13.0%--.

Column 6, in the table, Steamed at 140°C., Example 2 under Ultimate elongation, percent, "46" should be --36--.

Column 5, line 38, "10.370" should be --10,370--.

In the title, "Pipenidyl" should be --Piperidyl--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents